United States Patent [19]

Bobilin et al.

[11] 4,316,285
[45] Feb. 16, 1982

[54] FRAMING CIRCUIT FOR DIGITAL RECEIVER

[75] Inventors: Richard T. Bobilin, Fair Haven; Robert D. Howson, Middletown, both of N.J.

[73] Assignee: Bell Telephone Laboratories, Incorporated, Murray Hill, N.J.

[21] Appl. No.: 186,404

[22] Filed: Sep. 11, 1980

[51] Int. Cl.³ .......................... H04J 3/06; H04K 7/04
[52] U.S. Cl. .................................... 370/105; 371/47; 375/108; 375/116
[58] Field of Search .................. 371/42, 46, 47; 370/100, 105, 106; 375/108, 114, 116, 118; 340/147, 54

[56] References Cited

U.S. PATENT DOCUMENTS

| 4,016,368 | 4/1977 | Apple, Jr. | 370/105 |
| 4,032,885 | 6/1977 | Roth | 371/47 |
| 4,125,745 | 11/1978 | Steidl | 370/100 |
| 4,142,070 | 2/1979 | Landauer et al. | 370/105 |
| 4,154,984 | 5/1979 | Murasov | 370/105 |
| 4,229,794 | 10/1980 | Jensen et al. | 371/47 |

OTHER PUBLICATIONS

"DS-1 Extended Framing Format", PP1-7 Apr. 16, 1980 USITA Meeting at AT&T Basking Ridge, New Jersey.

Primary Examiner—Benedict V. Safourek
Attorney, Agent, or Firm—Thomas Stafford

[57] ABSTRACT

The possibility of framing a receiver on a false pattern either generated, for example, by a data subscriber, or simply one statistically occurring in the normal digital transmission is minimized by employing a cyclical-redundancy-check (CRC). Bits of a presently received time division signal are compared to bits of a CRC code word generated from the last previously received block of bits of the time division signal to generate error indications. When a predetermined number of CRC error indications is detected, i.e., loss of CRC, the framing bit pattern the receiver is synchronized with is considered a false pattern and reframing of the receiver is initiated. This process is iterated until no loss of CRC is detected for the framing bit pattern that the receiver is synchronized with. In a specific example, a 6-bit CRC code word is employed.

7 Claims, 9 Drawing Figures

FRAMING CIRCUIT FOR DIGITAL RECEIVER

CROSS REFERENCE TO RELATED APPLICATION

Copending U.S. patent applications Ser. No. 186,402 and Ser. No. 186,403 were filed concurrently herewith.

TECHNICAL FIELD

This invention relates to digital receivers and, more particularly, to a circuit arrangement for synchronizing the receiver with an incoming time division signal.

BACKGROUND OF THE INVENTION

In digital transmission systems it is necessary to synchronize a receiver with the incoming digital signal. In carrier systems, information is transmitted in frames and synchronization is realized by properly locating the frames by a process called framing.

In early channel banks framing is achieved by a so-called backward acting reframing arrangement. To this end, the received signal is compared to a locally generated framing pattern. When the comparison indicates errors are occurring, a search is initiated in order to reframe. In D1 systems the search includes slipping one bit at a time in order to locate the true framing pattern. In D2 and D3 systems, groups of eight bits are checked at a time in order to speed up the reframing process.

More recently, a system has been proposed as disclosed in U.S. Pat. No. 4,125,745 issued Nov. 14, 1978 in which the even framing bit positions of the presently received and last three DS1 super frames are monitored to detect whether or not a valid combination of the framing bits is present. Upon detection of an invalid combination or combinations which subsist for a prescribed number of errors, the circuit is switched into a search mode wherein all the bits in the DS1 super frame (i.e., 386 bits) are monitored in an attempt at finding the true framing pattern. Upon detection of a "true" framing pattern the circuit switches back to the monitoring mode.

A problem with the prior arrangements is the possibility of framing on a false framing pattern which emulates the true framing pattern and which is either generated, for example, by a subscriber transmitting a data pattern or one which may statistically occur in normal digital transmission.

SUMMARY OF THE INVENTION

The possibility of framing on a false framing pattern and other problems associated with reframing in a digital receiver to synchronize with a received time division signal are overcome, in accordance with an aspect of the invention, by comparing bits of the received time division signal with bits of a code word generated in accordance with a prescribed criterion from the received time division signal to generate code word error indications. When a predetermined number of errors is detected, i.e., loss of code word, the framing bit pattern the receiver is synchronized with is considered a false pattern and resynchronization (reframing) of the receiver is initiated. This process is iterated until no loss of code word indication is generated for the framing bit pattern that the receiver is synchronized with.

More specifically, a presently received block of bits of a time division signal includes code word bits in predetermined bit positions which were generated in accordance with a prescribed criterion from the previous block of bits of the time division signal. The bits of the received time division signal are compared with code word bits generated in accordance with the prescribed criterion from the previous block of bits of the received time division signal to generate error indications. Upon detection of a predetermined number of code word errors the receiver is deemed out-of-frame and reframing is initiated.

The possibility of the receiver remaining synchronized with a false framing bit pattern is virtually eliminated since the probability of a received signal including a data pattern which emulates both the true framing bit pattern and the code word bits is highly improbable.

In a specific embodiment of the invention, the code word bits are generated in accordance with a prescribed cyclic code generator polynominal. In one example, a six bit cyclic-redundancy-check (CRC) code word is employed with the code word bits being inserted in predetermined ones of framing bit positions of the time division signal.

BRIEF DESCRIPTION OF THE DRAWING

The invention will be more fully understood from the following detailed description of an illustrative embodiment thereof taken in connection with the drawing including the appended figures, in which.

DETAILED DESCRIPTION

To facilitate a clear comprehension of the present invention, yet at the risk of redundancy, the framing format of the aforementioned DS1 signal will be considered in greater detail at this point. In the original DS1 format, framing information is transmitted in the 193rd bit position of each frame. The framing pattern (1010 . . . ) appears in every frame, namely —1—0—1— —0—. In more recent systems the DS1 signal has been grouped into two groups of six frames each to form a so-called super frame with the sixth frame having A signaling bits and the twelfth frame having B signaling bits. The per frame pattern (1010 . . . ) appears in every other frame, namely —1—X—0—X—1—X—0—. The frames which do not carry per frame framing bits are called signaling subframes and are used to send signaling framing information. The subframe pattern (111000 . . . )—1—X—1—X—1—X—0—X—0—X—0 is employed to identify the sixth and twelfth frames.

The DS1 signal has served us well and the present invention may equally be utilized with that signal as well as other and different digital formats.

However, in practicing the present invention it is contemplated that a so-called extended digital format is to be utilized including 24 frames in four groups of six frames each, hereinafter referred to as an extended super frame (ESF). Moreover, predetermined bits in the format, in this example, bit positions previously employed for either per frame (Ft) framing bits or sub-frame (Fs) framing bits are utilized to realize an additional data link and for use to transmit a cyclical-redundancy-check (CRC) code word to be used in monitoring transmission performance and to provide, in accordance with an aspect of the invention, an added check to determine whether the receiver is synchronized with a false framing pattern and thereby ensuring reframing on the one and only one true framing pattern. Since four groups of six frames each are employed, four signaling bits are available, namely, A,B,C and D. In this particular example, not to be considered as limiting the scope of the invention, the eight kilobit framing bit channel is distributed into a four kilobit data link, two kilobit CRC performance monitoring channel and two kilobit channel for framing. A summary of the extended format is shown in the following table:

TABLE I

| | Extended Super Frame (ESF) | | | | |
|---|---|---|---|---|---|
| | F-Bits | | Bit number(s) in each time slot | | |
| Frame Number | F | Data | Error Detection | for Information | for Signaling | Signaling Channel |
| 1 | — | M1 | — | 1–8 | | |
| 2 | — | — | C1 | 1–8 | | |
| 3 | — | M2 | — | 1–8 | | |
| 4 | 0 | — | — | 1–8 | | |
| 5 | — | M3 | — | 1–8 | | |
| 6 | — | — | C2 | 1–7 | 8 | A |
| 7 | — | M4 | — | 1–8 | | |
| 8 | 0 | — | — | 1–8 | | |
| 9 | — | M5 | — | 1–8 | | |
| 10 | — | — | C3 | 1–8 | | |
| 11 | — | M6 | — | 1–8 | | |
| 12 | 1 | — | — | 1–7 | 8 | B |
| 13 | — | M7 | — | 1–8 | | |
| 14 | — | — | C4 | 1–8 | | |
| 15 | — | M8 | — | 1–8 | | |
| 16 | 1 | — | — | 1–8 | | |
| 17 | — | M9 | — | 1–8 | | |
| 18 | — | — | C5 | 1–7 | 8 | C |
| 19 | — | M10 | — | 1–8 | | |
| 20 | 1 | — | — | 1–8 | | |
| 21 | — | M11 | — | 1–8 | | |
| 22 | — | — | C6 | 1–8 | | |
| 23 | — | M12 | — | 1–8 | | |
| 24 | 0 | — | — | 1–7 | 8 | D |

An arrangement for transmitting a time division signal in the extended super frame format is described in copending application Ser. No. 186,402 filed concurrently herewith.

Figure 1:
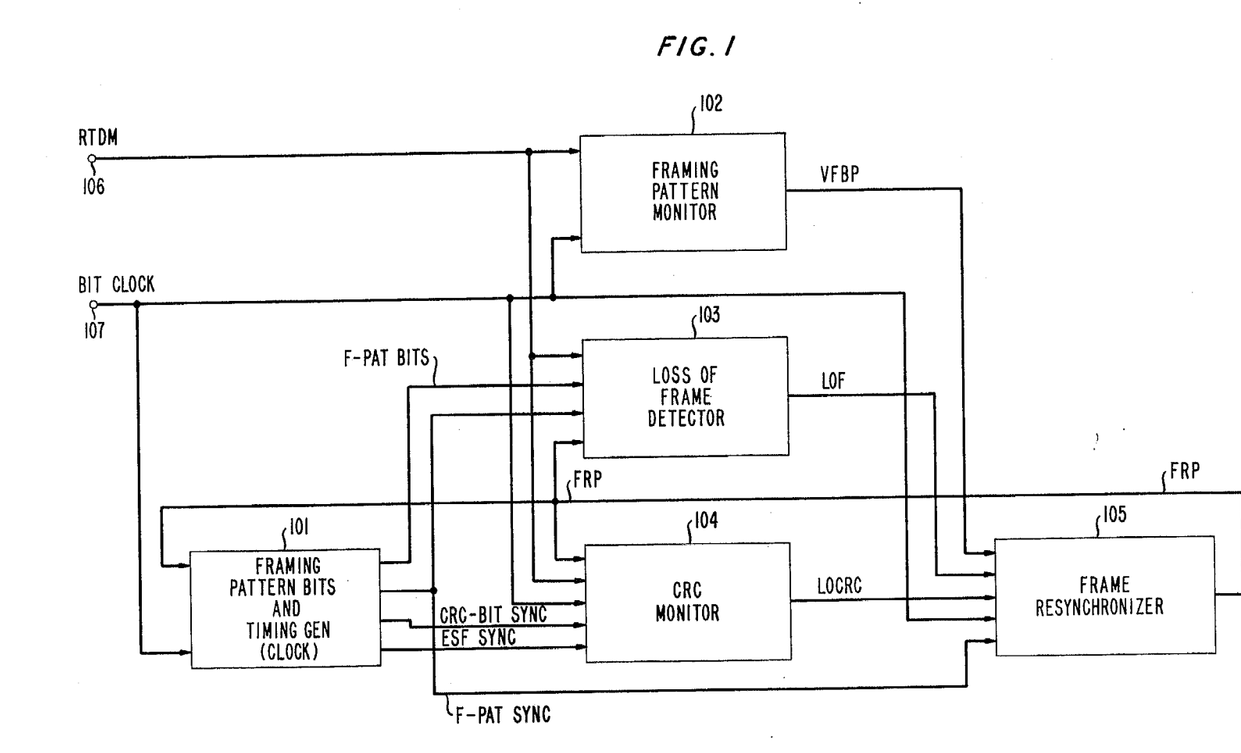
FIG. 1 shows in simplified form details of a framing circuit including an embodiment of the invention.

FIG. 1 shows in simplified block form details of a framing circuit employing one embodiment of the invention. Accordingly, shown is framing pattern bits and timing generator 101 (hereinafter referred to as CLOCK), framing pattern monitor 102, detector 103, CRC monitor 104 and frame resynchronizer 105.

Figure 2:
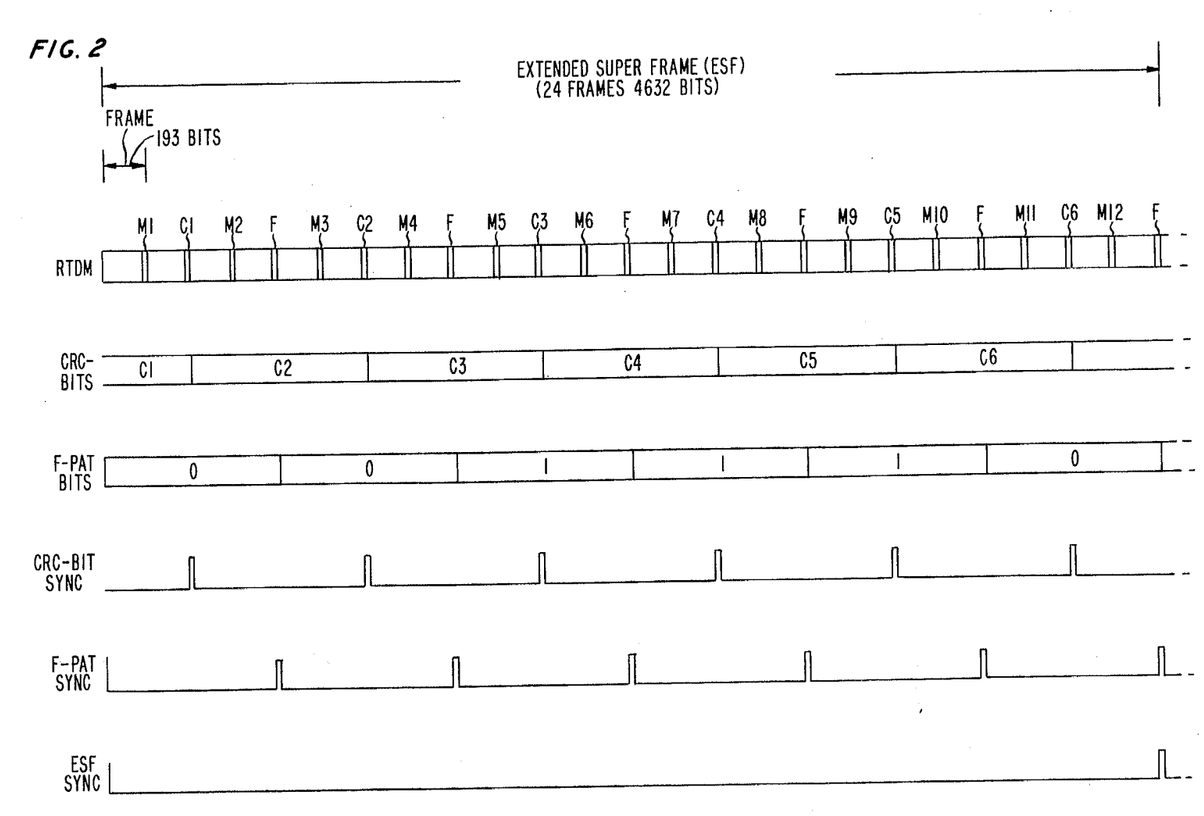
FIG. 2 illustrates a sequence of signals useful in explaining the operation of the framing circuit.

CLOCK 101 is an autonomous timing generator and is responsive to a bit clock signal supplied via terminal 107 for generating, among others, framing pattern bits (F-PAT Bits) in a predetermined pattern, in this example, as shown in Table I above and FIG. 2, framing pattern sync (F-PAT SYNC), extended super frame sync (ESF SYNC) and CRC-BIT SYNC. The bit clock signal is, for example, the T1 clock having a bit rate of 1.544 megabits per second and readily available in digital transmission systems. CLOCK 101 includes counter arrangements and the like which are responsive to a frame resynchronization pulse (FRP) from frame resynchronizer 105 to be set to an initial condition for generating F-PAT BITS and the other timing signal in-frame with RTDM (FIG. 2). These signals and their relationship to the bits in the extended super frame (ESF) of a received time division multiplexed (RTDM) signal are shown in FIG. 2 to be described below.

A received time division multiplexed signal (RTDM) is supplied via terminal 106 to framing pattern monitor 102, loss of frame detector 103 and CRC monitor 104.

Figure 3:
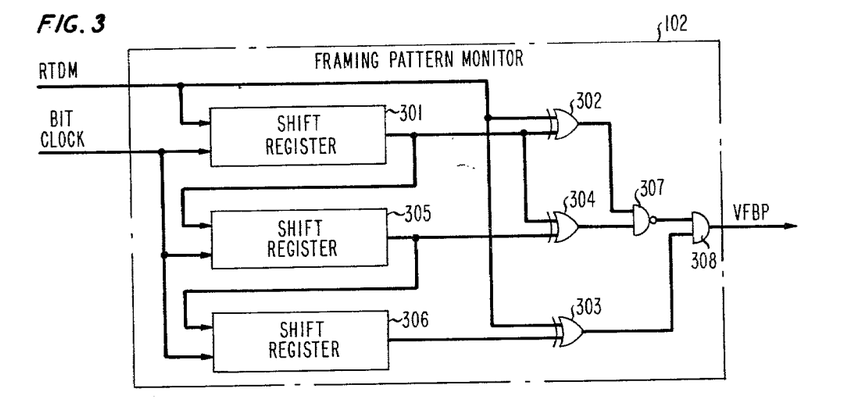
FIG. 3 depicts details of the framing pattern monitor employed in the framing circuit of FIG. 1.

Framing pattern monitor 102 is responsive to RTDM and BIT CLOCK for generating signals representative of valid framing bit positions (VFBP). VFBP signals are supplied to frame synchronizer 105 for use in the resynchronization process (reframing). Details of framing pattern monitor 102 are shown in FIG. 3 and described below.

Figure 4:
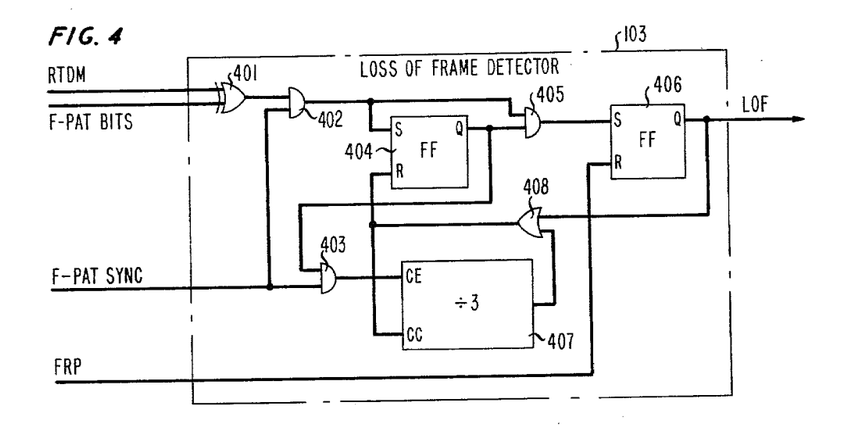
FIG. 4 illustrates details of the loss of frame detector used in the framing circuit of FIG. 1.

Loss of frame detector 103 is employed to compare F-PAT BITS locally generated by autonomous CLOCK 101 at the F-PAT SYNC rate, also generated by CLOCK 101, with the framing bits of RTDM. When a predetermined error rate is detected, in this example, two framing errors out of four consecutive framing bits, a loss of frame (LOF) signal is generated and supplied to frame resynchronizer 105. LOF is used to initiate the resynchronization (reframing) process. A frame resync pulse (FRP) signal generated by frame resynchronizer 105 is employed to reset detector 103 to an initial condition. Details of loss of frame detector 103 are shown in FIG. 4 and described below.

Figure 5:
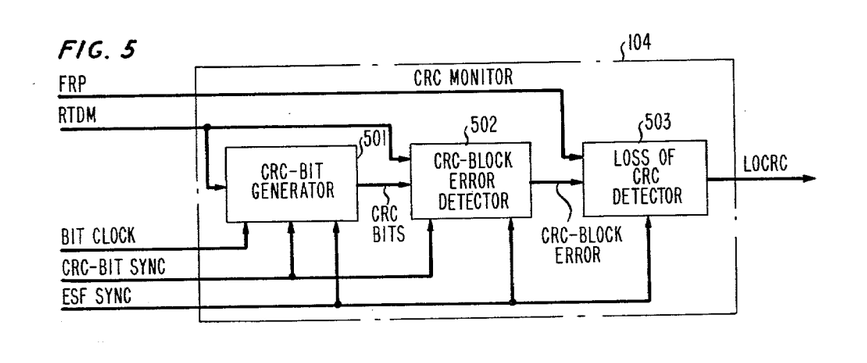
FIG. 5 shows details of the CRC monitor utilized in the framing circuit of FIG. 1.

CRC monitor 104 is employed, in accordance with another aspect of the invention, to monitor cyclical-redundancy-check (CRC) code word bits in RTDM for generating a loss of CRC (LOCRC) signal when a prescribed CRC error threshold is reached. In this example, LOCRC is generated when a predetermined number of consecutive CRC block errors has been detected. A CRC block error is generated by one or more CRC bit errors per ESF interval. To this end, BIT CLOCK, ESF SYNC and CRC-BIT SYNC are supplied to CRC monitor 104 from CLOCK 101. LOCRC is supplied to frame resynchronizer 105 where it is employed in the resynchronization process. CRC monitor 104 is reset to an inital condition via FRP from frame synchronizer 105. As indicated above, use of the CRC check in the resynchronization process provides added assurance, in accordance with an aspect of the invention, to determine whether the receiver is synchronized with a data pattern which emulates the true framing pattern, i.e., a false framing bit pattern corresponding to F-PAT BITS as shown in Table I and FIG. 2 and to initiate the resynchronization process to eventually synchronize with the true framing bit pattern. Details of CRC monitor 104 are shown in FIG. 5 and described below.

Figure 6:
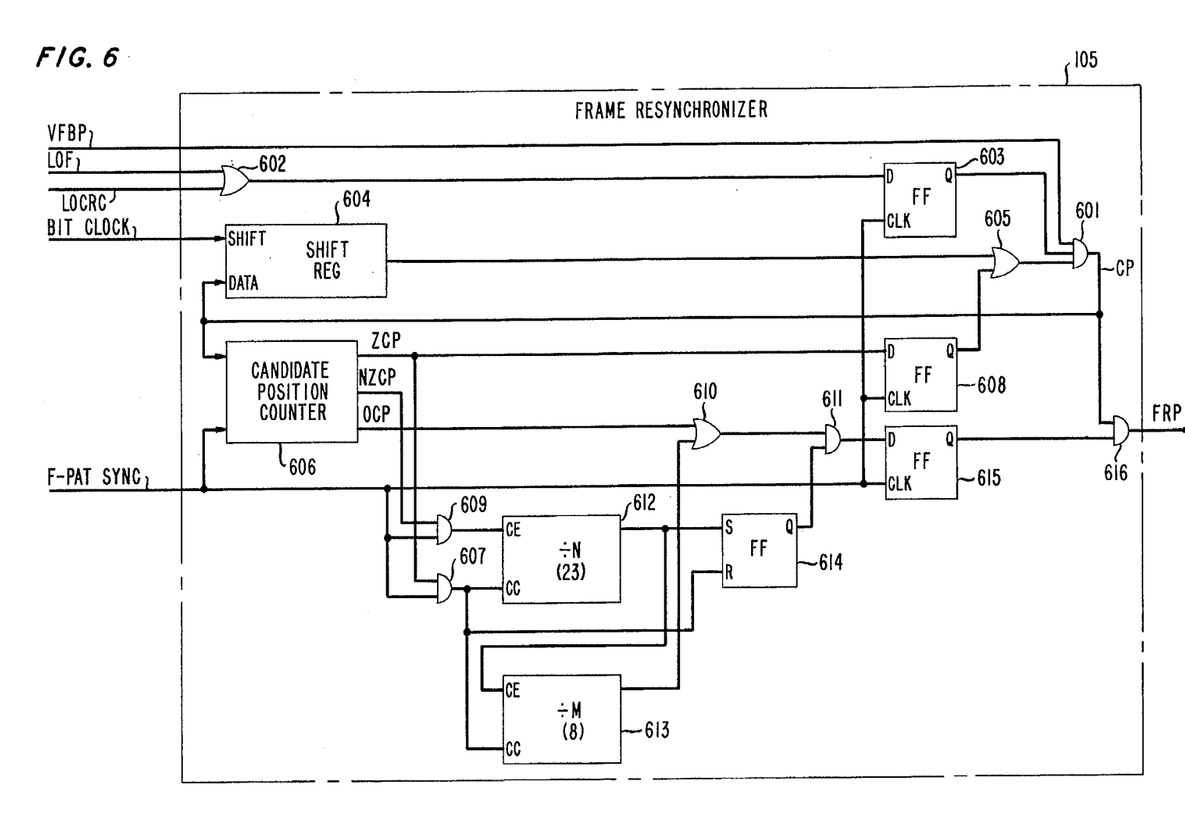
FIG. 6 depicts details of the frame resynchronizer used in the framing circuit of FIG. 1.

BIT CLOCK and F-PAT SYNC are also supplied to frame synchronizer 105 where they are employed in conjunction with VFBP, LOF and LOCRC for synchronizing, in accordance with an aspect of the invention, on the one and only one true framing candidate position. To this end, a frame resynchronization pulse (FRP) is generated when a VFBP=1 is present and other conditions have been met. FRP is utilized, in accordance with an aspect of the invention, to resynchronize autonomous CLOCK 101 for generating among others F-PAT BITS, F-PAT SYNC, ESF SYNC and CRC-BIT SYNC in the appropriate sequence as shown in FIG. 2, i.e., in-frame with bits of RTDM and to reset loss of frame detector 103 and CRC monitor 104. Resynchronization of the receiver is initiated when it is synchronized with a false framing bit pattern in accordance with an aspect of the invention, by utilizing LOCRC as an added check of whether RTDM is in frame. Details of frame resynchronizer 105 are shown in FIG. 6 and described below.

In summary, the framing circuit of FIG. 1 monitors the incoming RTDM signal by comparing bits of a locally generated framing pattern to the bits of RTDM to determine whether a prescribed framing error rate is present. If so, resynchronization is initiated by generation of loss of frame signal LOF. An additional check including monitoring bits of a CRC code word in RTDM relative to CRC code word bits generally locally from RTDM is employed to determine whether the receiver is synchronized with a data pattern that emulates the true framing pattern. If so, resynchronization is also initiated by generation of loss of CRC signal LOCRC.

FIG. 2 shows a sequence of signals generated by autonomous CLOCK 101 and their relationship to a received time division multiplexed (RTDM) signal. Accordingly, shown in FIG. 2 is one extended super frame (ESF) of RTDM. As indicated above, in this example not to be construed as limiting the invention, ESF includes 24 frames each having 193 bits for a bit block of 4632 bits. Although the framing bit position is shown as bit 193 of each frame, the framing bit position may equally be considered the first bit in each frame. Each ESF is initiated in a transmitter by ESF SYNC. Similarly, in a receiver ESF SYNC denotes the ESF interval and is generated by CLOCK 101 every 4632 bits of BIT CLOCK. As described in the aforementioned copending application Ser. No. 186,402 data bits M1 through M2 are in framing bit positions 1, 3, 5, 7, 9, 11, 13, 15, 17, 19, 21 and 23, respectively, of RTDM. These data signals are of no further interest concerning the instant invention. Framing pattern bits (F-PAT BITS) are in framing pattern bit positions 4, 8, 12, 16, 20 and 24 of RTDM and CLOCK 101 when in synchronism with RTDM generates F-PAT BITS corresponding to the received F-PAT BITS in the pattern as shown in FIG. 2, namely, 001110001110 .... Similarly, CRC code word bits are in framing bit positions 4, 8, 12, 16, 20 and 24 of the presently received ESF of RTDM. CRC bits C1-C6 were generated by CRC monitor 104 from the last received ESF for comparison with the presently received CRC bits. CRC-BIT SYNC pulses are generated by CLOCK 101 every 772 bits of BIT CLOCK at appropriate instants corresponding to the received CRC bit positions as shown in FIG. 2. Similarly, F-PAT SYNC pulses are generated at the extended framing pattern rate, i.e., every 772 bits of BIT CLOCK.

FIG. 3 shows in simplified form details of framing pattern monitor 102. As indicated above, monitor 102 yields a logical 1 VFBP output when a "valid" framing bit position is detected in RTDM. To this end, RTDM is supplied to an input of shift register 302, an input of Exclusive OR gate 302 and an input of Exclusive OR gate 303. An output of shift register 301 is supplied to another input of Exclusive OR gate 302, an input of Exclusive OR gate 304 and an input of shift register 305. An output from shift register 305 is supplied to another input of Exclusive OR gate 304 and to an input of shift register 306. An output of shift register 306 is supplied to another input of Exclusive OR gate 303. BIT CLOCK signals are supplied to the shift inputs of each of registers 301, 305 and 306 to advance the bits, in this example, at the T1 rate of 1.544 megabits per second. Outputs from Exclusive OR gates 302 and 304 are supplied to NAND gate 307. In turn, an output of NAND gate 307 is supplied to one input of AND gate 308. An output from Exclusive OR gate 303 is supplied to another input of AND gate 308. Signals developed at an output of AND gate 308 represent the presence or absence of a valid framing bit position (VFBP). When VFBP is a logical 1 a "valid" framing bit position is present. Gates 302, 303, 304, 307 and 308 form a logic network to monitor for valid framing bit combinations, in this example, 0001
0011
0111
1110
1100
1000

Since, in this example the framing pattern bits occur in every fourth framing bit position register 301, 305 and 306 each include 772 bit positions. For D2 operation only 386 bit positions are needed. A problem of relying solely on monitoring the "valid" framing patterns noted above as described in the U.S. Pat. No. 4,125,745 cited above is that a data subscriber may readily emulate those patterns. Consequently, the receiver may remain in an out of frame condition without detecting that condition. This possibility is virtually eliminated by employing, in accordance with an aspect of the invention, an additional check of code word bits inserted in predetermined bit positions of RTDM with code word bits generated in the receiver from bits of RTDM.

FIG. 4 depicts in simplified form details of loss of frame detector 103. Detector 103 is a two-out of-four framing error detector. Accordingly, RTDM is supplied to a first input of Exclusive OR gate 401, while F-PAT BITS generated locally by autonomous CLOCK 101 are supplied to a second input of Exclusive OR gate 401. Gate 401 compares the bits of RTDM with F-PAT BITS at F-PAT SYNC rate and generates a logical 1 when there is a disparity. An output from Exclusive OR gate 401 is supplied to one input of AND gate 402. F-PAT SYNC is supplied to another input of AND gate 402 and to one input of AND gate 403. AND gate 402 is employed to interrogate the output of Exclusive OR gate 402 at the F-PAT SYNC rate and generate a logical 1 when a framing bit error is detected. An output of AND gate 402 is supplied to the set (S) input flip-flop 404 and to one input of AND gate 405. Flip-flop 404 is employed to generate a first output when a first framing error is detected. To this end, output of Q of flip-flop is supplied to a second input of AND gate 403 and AND gate 405. Consequently, AND gates 403 and 405 are both enabled upon detection of a first framing error. AND gate 405 generates a second output indicating detection of a second framing error. The second output from AND gate 405 is supplied to a set (S) input of flip-flop 406. Flip-flop 406 generates a logical 1 LOF at output Q when two errors are detected. An output of AND gate 403 is supplied to input CE of counter 407. Counter 407 provides a divide by three function and an output is supplied via OR gate 408 to counter clear CC input of counter 407 and the reset (R) input of flip-flop 404. Similarly, output Q of flip-flop 406 is also supplied via OR gate 407 to input CC of counters 407 and input R of flip-flop 404. In operation, counter 407 is enabled via AND gate 403 upon detection of a first framing error. Thereafter, either three addition framing intervals (772 bits each) are allowed to pass or a second framing error is detected within the three framing intervals prior to resetting detector 103. Thus, the desired two out of four framing error detection is realized. Once set, flip-flop 406 remains set generating LOF=1 until reset by framing resynchronization pulse FRP from frame resynchronizer 105.

Figure 7:
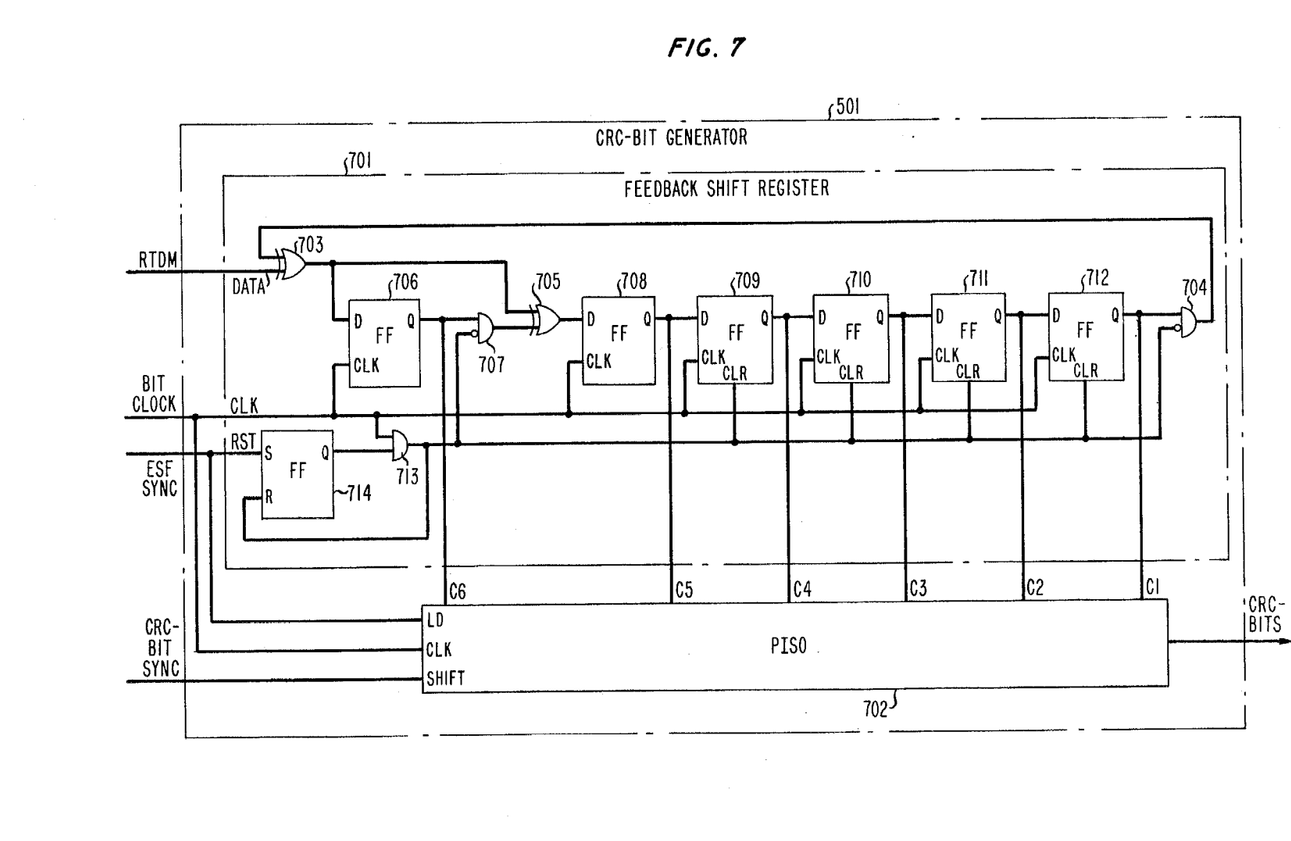
FIG. 7 shows details of the CRC generator employed in the CRC monitor of FIG. 5.
Figure 8:
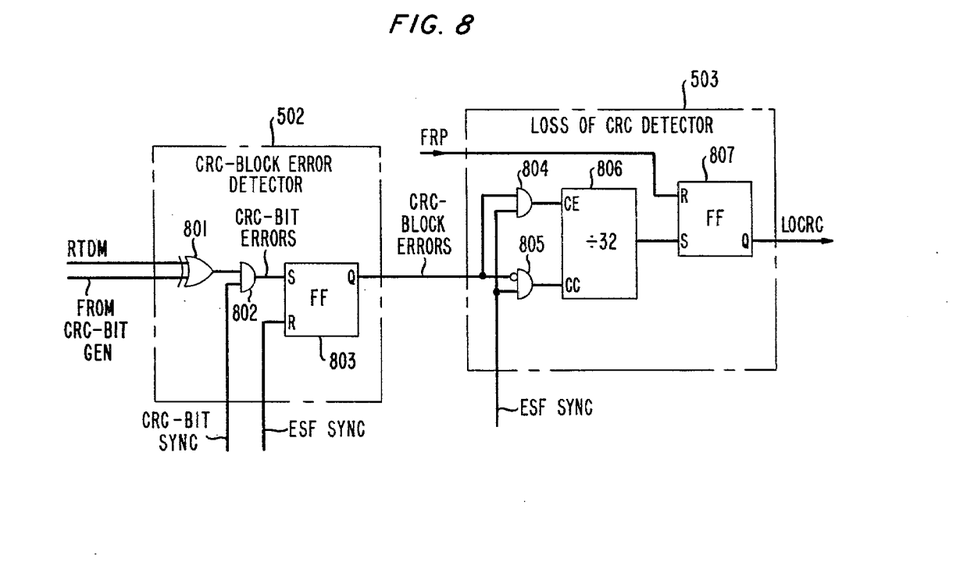
FIG. 8 depicts details of the CRC block error detector and the loss of CRC detector used in the CRC monitor of FIG. 5.

FIG. 5 shows in simplified form details of CRC monitor 104 which generates a loss of CRC (LOCRC) signal for use, in accordance with an aspect of the invention, in reframing on the one and only one true framing pattern in this example, as shown in FIG. 2. That is to say, LOCRC is utilized as an added check to determine whether the framing bit pattern synchronized with is a false pattern. Accordingly, RTDM is supplied to CRC-bit generator 501 and to CRC-block error detector 502. CRC bit generator 501 generates CRC code word bits, in this example, from bits of a presently received extended superframe (ESF) of RTDM for comparison in CRC-Block error detector 502 with bits of the next received ESF of RTDM. Stated another way, bits of a presently received ESF of RTDM are compared with CRC code word bits generated from the last previously received ESF of RTDM. To this end, CRC bits are serially supplied from CRC-bit generator 501 to CRC-block error detector 502. Timing signals BIT CLOCK, CRC-BIT SYNC and ESF SYNC are also supplied from CLOCK 101 to CRC-bit generator 501. Similarly, CRC-BIT SYNC and ESF SYNC are supplied to CRC-Block error detector 502, while ESF SYNC is supplied to loss of CRC detector 503. Loss of CRC detector 503 is employed to determine when the CRC-block errors exceed a prescribed threshold for generating a loss of CRC (LOCRC) signal which is supplied to frame resynchronizer 105. Loss of CRC detector 503 is reset to an initial condition via frame resynchronization pulse FRP from frame resynchronizer 105. Details of CRC generator 501 are shown in FIG. 7 and explained below. Details of CRC-Block error detector 502 and loss of CRC detector 503 are shown in FIG. 8 and explained below.

Figure 9:
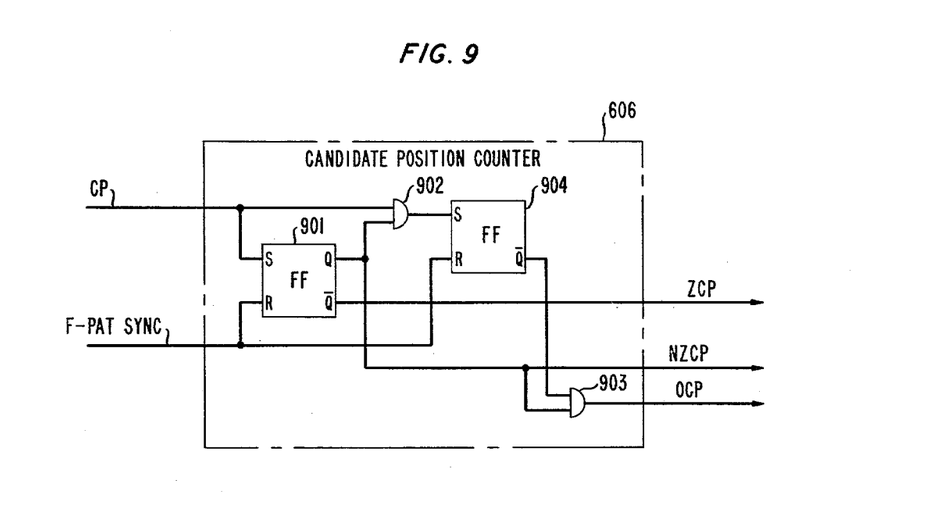
FIG. 9 shows details of the candidate position counter utilized in the frame resynchronizer of FIG. 6.

FIG. 6 shows in simplified form details of frame synchronizer 105. As indicated above frame synchronizer 105 is employed to synchronize CLOCK 101 with the received framing bit pattern and is responsive to either LOF or LOCRC for initiating the resynchronization process. To this end, VFBP is supplied to a first input of AND gate 601 while LOF from framing pattern error detector 103 and LOCRC from CRC monitor 104 are supplied via OR gate 602 to input D of flip-flop 603. F-PAT SYNC is supplied to input CLK of D-type flip-flop 603. Output Q of flip-flop 603 is supplied to a second input of AND gate 601. Shift register 604 is employed to store all possibly valid framing bit positions, i.e., is a framing bit history register. In this example, register 604 is a 772 bit register and is advanced via BIT CLOCK. Output CP of AND gate 601 is supplied to the data input of shift register 604, and to a first input of AND gate 616. An output of shift register 604 is supplied via OR gate 605 to a third input of AND gate 601. When CP is a logical 1 a possibly valid framing bit position candidate has been detected and is stored in shift register 604 where it is advanced at the BIT CLOCK rate to be utilized in the resynchronization process. Candidate position counter 606 is employed to yield an output representative of whether there are zero candidate positions (ZCP), one or more candidate positions (NZCP) or one candidate position (OCP) in a frame pattern interval, in this example 772 bits of RTDM. To this end, output CP of AND gate 601 is also supplied to candidate position counter 606. Candidate position counter 606 is reset to an initial condition via F-PAT SYNC. Output ZCP is supplied to one input of AND gate 607 and to input D of D-type flip-flop 608, output NZCP is supplied to one input of AND gate 609, while output OCP is supplied via OR gate 610 to one input of AND gate 611. Details of candidate position counter 606 are shown in FIG. 9 and explained below. F-PAT SYNC is supplied to the CLK input of flip-flop 608. Output Q of flip-flop 608 is supplied via OR gate 605 to the third input of AND gate 601. Consequently, when there are zero framing candidates present as indicated by ZCP being a logical 1 and LOF and/or LOCRC are logical 1 causing output Q of flip-flop 603 to be a logical 1 and VFBP is a logical 1, CP will be a logical 1 and a logical 1 is loaded into shift register 604 thereby making the incoming bit position corresponding to VFBP=1 a framing candidate. If false framing bits are also present in bit patterns emulating the true framing bit pattern, logic 1's corresponding to those bit positions are also into shift register 604. These signals are advanced at the BIT CLOCK rate and supplied via OR gate 605 to AND gate 601 during the next framing pattern interval, i.e., 772 bits later. This enables AND gate 601 to generate another CP=1 is a corresponding VFBP=1 is detected. The CP=1 is loaded in shift register 604 and the process continues. An advantage of advancing shift register 604 while loading is that the operation is faster as compared to the history register arrangement as described in the U.S. Pat. No. 4,125,745 patent cited above. F-PAT SYNC is supplied to second inputs of AND gates 607 and 609 for enabling them at the F-PAT SYNC rate, i.e., once every 772 bits of RTDM. An output of AND gate 607 is supplied to clear inputs CC of counters 612 and 613 and to the reset (R) input of flip-flop 614. Consequently, counters 612 and 613 are cleared and flip-flop 614 is reset when no candidate position is present, i.e., ZCP=1. An output of AND gate 609 is supplied to input CE of counter 612. Thus, counter 612 counts the number of candidate positions and yields an output when a predetermined number (N) of candidates are detected, in this example, N=24 consecutive "valid" framing bit positions must be detected before any further action is taken. This insures in part that the correct framing bit pattern is used to resync on. An output from counter 612 is supplied to the set (S) input of flip-flop 614 and to count input CE of counter 613. Output Q of flip-flop 614 is supplied to a second input of AND gate 611. An output of AND gate 611 is supplied to input D of D-type flip-flop 615. F-PAT SYNC is supplied to the CLK input of flip-flop 615. In turn, output Q of flip-flop 615 is supplied to a second input of AND gate 616. An output of AND gate 616 is the frame resynchronization pulse (FRP). Counter 613 is employed to count a predetermined number M of the outputs from counter 612. In this example, M=8 is employed to generate an output which is supplied via OR gate 610 to enable AND gate 611 when more than one "valid" framing pattern is detected. This enables resynchronization on one of the framing patterns for the purpose of testing it to determine, in accordance with an aspect of the invention, whether the receiver is synchronized on a false pattern which emulates the true framing bit pattern.

Operation of frame resynchronizer 105 is to insure synchronizing on the one and only one true framing pattern and not on a false pattern which emulates the true framing bit pattern and is either generated by, for example, a data subscriber or one which may occur in normal digital transmissions. Initially, it is assumed that LOF and LOCRC are both logical 0 indicating an in-frame condition. In turn, output Q of flip-flop 603 is a logical 0 and AND gate 601 is inhibited generating CP=0. This, in turn, causes candidate position counter 606 to generate ZCP=1, NZCP=0 and OCP=0. In response to ZCP=1, flip-flop 608 generates a logical 1 at output Q which enables, in part, AND gate 601. When LOF and/or LOCRC are logical 1 indicating a loss of frame condition flip-flop 603 generates a logical 1 Q output which enables AND gate 601. When a logical 1 VFBP signal, indicating a "valid" framing bit position is received, AND gate 601 generates CP=1. In turn, a logical 1 is loaded into shift register 604 and advanced at the BIT CLOCK rate. Candidate position counter 606 responds to CP=1 to generate ZCP=0, NZCP=1 and possibly OCP=1. Assuming only one framing candidate position is detected during a framing pattern interval, i.e., 772 bits both NZCP and OCP are logical 1's and counter 612 is enabled. If at least one candidate per F-PAT SYNC interval is detected for 24 framing bit positions i.e., 24 F-PAT SYNC intervals, flip-flop 614 is set. Subsequently, when all but one candidate is eliminated, AND gate 611 generates a logical 1. In turn, flip-flop 615 generates a logical 1 which enables AND gate 616 to generate FRP=1 to resync CLOCK 101 and reset framing pattern error detector 103. When more than one framing candidate is detected NZCP=1 and OCP=0. If this condition continues, i.e., a subscriber may be emulating the true framing pattern, AND gate 611 is disabled until counter 613 counts M X N consecutive framing bit positions which have "valid" framing bits, in this example, 8×24=192. At which time AND gate 611 is enabled by the output from counter 613 supplied via OR gate 610. In turn flip-flop 615, enables AND gate 616 to generate a logical 1 FRP which resets CLOCK 101 and framing pattern error detector 103. In essence, several framing patterns are present including the valid one. Therefore, this procedure is to assume one of the patterns is the valid one and test it. Since an FRP=1 is generated, loss of frame detector 103 and CRC monitor 104 are reset causing LOF=0 and LOCRC=0, and autonomous CLOCK 101 is set to its initial timing condition in synchronism with the framing bit pattern being tested. However, if the framing pattern that CLOCK 101 is synchronized on is not the one true framing pattern CRC monitor 104 generates a logical 1 LOCRC signal causing an out-of-frame condition. This occurs, as indicated above, because it is highly improbable either that a data subscriber would generate a data pattern or that a data pattern would occur in normal transmission including the CRC bit pattern over any number of ESFs. Since CLOCK 101 is synchronized to the first framing pattern candidate to be tested, the next framing candidate causes a FRP=1 to be generated thereby synchronizing CLOCK 101 on that framing pattern. Again, if the framing pattern presently being tested is also a false pattern, CRC monitor 104 generates a LOCRC logical 1 signal indicating an out-of-frame condition and resynchronization is initiated. This procedure is iterated until the receiver is synchronized with the true framing pattern. CRC monitor 104 generates a LOCRC logical 0 signal thereby indicating, in accordance with an aspect of the invention, that the receiver is synchronized with the true framing bit pattern. With RTDM being in-frame both LOCRC and LOF are logical 0 disabling AND gate 601 which, in turn, generates CP=0 and ZCP=1. ZCP-1 enables AND gate 607 to reset counters 612 and 613 in response to F-PAT SYNC and causes flip-flop 608 to generate a logical 1 to enable in part AND gate 601. Thus, frame resynchronizer 105 is reinitialized.

FIG. 7 shows details of CRC-bit generator 501. Accordingly, shown are feedback shift register 701 and parallel in serial out (PISO) shift register 702. Feedback shift register 701 generates from RTDM a CRC code word having a predetermined number of bits, in this example, in accordance with the cyclic code generator polynomial $$x^6 + x + 1 \tag{1}$$

Cyclic codes are further described in an article by W. W. Peterson and D. T. Brown entitled "Cyclic Codes for Error Detection", *Proceedings of the IRE,* January 1961, pages 228-235. See also Chapters 7 and 8 of *Error Correcting Codes,* The MIT Press, 1972 authored by W. W. Peterson and E. J. Weldon, Jr. To this end, shift register 701 is responsive to bits of RTDM, BIT CLOCK and ESF SYNC to generate bits C1-C6 of a CRC code word from bits of the presently received ESF which are supplied to PISO 702 and serially shifted out via CRC-BIT SYNC during the next subsequent ESF. Thus, RTDM is supplied via the data input to one input of Exclusive OR gate 703. An output from AND gate 704 which is C1, except when AND gate 704 is inhibited, is supplied to a second input of Exclusive OR gate 703. Consequently, Exclusive OR gate 703 adds the binary output of AND gate 704 to the RTDM bit supplied via the data input. This generates the $1+x^6$ function. An output from Exclusive OR gate 703 is supplied to one input of Exclusive OR gate 705 and D-type flip-flop 706. The Q output of flip-flop 706 is CRC bit C6 supplied to shift register 702 and is also supplied via AND gate 707 to a second input of Exclusive OR gate 705. This is the x function. The output of Exclusive OR gate 705 is the polynomial $x^6 + x + 1$ and is supplied to D-type flip-flop 708. The output of flip-flop 708 is CRC bit C5 and is supplied to shift register 702 and D-type flip-flop 709. Similarly, the serial connection of D-type flip-flops 709, 710, 711 and 712 generate CRC bits C4, C3, C2 and C1, respectively, all supplied to register 702. The output of flip-flop 610 is the $x^6$ function and is supplied via AND gate 704 to an input of Exclusive OR gate 703. BIT CLOCK is supplied via CLK input to one input of AND gate 713 and to the CLK inputs of flip-flops 706, 708-712. ESF SYNC is supplied via RST input to the set (S) input of flip-flop 714. The Q output of flip-flop 612 is supplied to a second input of AND gate 713. The output of AND gate 713 is supplied to the reset (R) input of flip-flop 714 and to the clear (CLR) inputs of flip-flops 709-712. AND gate 713 and flip-flop 714 generate a reset pulse to initialize feedback shift register 701 to an all 0 state at the beginning of each extended super frame, i.e., C1-C6 are all 0. AND gates 704 and 707 are used to ensure processing of a RTDM bit supplied concurrently with ESF SYNC. Bits C1-C6 are loaded in parallel into PISO 702 in response to ESF SYNC. Thereafter, they are shifted out in series at the CRC-BIT SYNC rate in synchronism with BIT CLOCK. For a further explanation of CRC code words used in monitoring transmission, see co-pending application Ser. No. 186,402 noted above.

FIG. 8 shows details of CRC-block error detector 502 and loss of CRC detector 503. CRC-block error detector 502 includes Exclusive OR gate 801 which is supplied with incoming time division multiplex signal RTDM, in this example, in the extended super frame (ESF) format and with the CRC bits from CRC bit generator 501. Exclusive OR gate 801 compares the bits in RTDM presently being received with CRC bits generated from the previously received ESF. The output of Exclusive OR gate 801 is supplied to one input of AND gate 802 which is enabled at the CRC bit rate via CRC BIT SYNC. Consequently, the output of Exclusive OR gate 801 is interrogated when a received CRC bit should be present. Since the CRC bits being received and the CRC bits generated by CRC bit generator 501 are obstensively derived from the same signal, they should be identical. When the received CRC bit and locally generated CRC bit are not similar Exclusive OR gate 801 generates a logical 1 representative of a CRC bit error which is supplied via AND gate 802 to the set (S) input of flip-flop 803. Flip-flop 803 is reset via ESF SYNC being supplied to the reset (R) input. Thus, in this example, one error per extended super frame is detectable, i.e., a CRC block error. Output Q of flip-flop 803 representative of a CRC block error is supplied to one input of AND gate 804 and an inhibit input of AND gate 805 in loss of CRC detector 503. ESF SYNC is supplied to second inputs of AND gates 804 and 805. Consequently, AND gate 804 interrogates the Q output of flip-flop 803 upon the occurrence of ESF SYNC. An output of AND gate 804 is the CRC block error indication and is supplied to input CE of counter 806. AND gate 805 is employed to reset counter 806 when no CRC block error is present concurrent with ESF SYNC. To this end, and output of AND gate 805 is supplied to counter clear input CC of counter 806. If a CRC block error is detected, i.e., output Q of flip-flop 803 being a logical 1, AND gate 805 is inhibited and counter 806 will not be cleared. Conversely, if a CRC block error is not present counter 806 will be cleared. Thus, in this example, a predetermined number of consecutive CRC block errors must be detected to generate a loss of CRC (LOCRC) logical 1 signal. It has been determined that 32 consecutive CRC block errors is a reasonable error threshold in relationship to loss of frame statistics. An output of counter 806 is supplied to the set (S) input of flip-flop 807 while frame resynchronization pulse FRP is supplied to the reset (R) input. Output Q of flip-flop 807 is loss of CRC signal LOCRC. Consequently, upon detection of the predetermined number of consecutive CRC block errors flip-flop 807 is set to generate a logical 1 LOCRC signal which remains until a frame resynchronization pulse FRP is generated.

FIG. 9 shows details of candidate position counter 606. As indicated above, candidated position counter 606 is responsive to the candidate present (CP) output of AND gate (FIG. 6) to generate either a zero candidate position (ZCP), a non-zero candidate position (i.e., one or more) or a one candidate position (OCP) output. To this end, CP is supplied to the set (S) input of flip-flop 901 and to one input of AND gate 902. Output Q of flip-flop 901 is NZCP and when a logical 1 represents one or more candidate positions. NZCP is supplied to a second input of AND gate 902 and one input of AND gate 903. Output $\bar{Q}$ of flip-flop 901 is ZCP and represents no candidate positions when a logical 1. An output of AND gate 902 is supplied to the set (S) input of flip-flop 904. Output $\bar{Q}$ of flip-flop 904 is supplied to a second input of AND gate 903. An output of AND gate 903 is OCP and represents one candidate position when a logical 1. F-PAT SYNC is supplied to reset (R) inputs of flip-flops 901 and 904 to reset them at the F-PAT SYNC rate. Operation of candidate position counter 606 is straightforward. If there are no candidate positions present CP is a logical 0 and ZCP is a logical 1, NZCP a logical 0 and OCP a logical 0. With only one CP pulse supplied during a F-PAT SYNC interval, flip-flop 901 is set to yield a logical 1 at output Q and flip-flop 904 is not yielding a logical 1 NZCP at output $\bar{Q}$. In turn, AND gate 903 yields a logical 1 OCP. With more than one CP pulse supplied during the F-PAT SYNC interval, flip-flop 904 is set yielding a logical 0 $\bar{Q}$ output which disables AND gate 903 yielding a logical 0 OCP. Consequently, with more than one logical 1 CP detected during a F-PAT SYNC interval NZCP remains a logical 1.

We claim:

1. A framing circuit for synchronizing a digital receiver to a received time division multiplexed signal, CHARACTERIZED BY,
   means responsive to bits of the received time division multiplexed signal for generating in accordance with a prescribed criterion a code word having a predetermined number of bits,
   means for comparing said code word bits with bits of the received time division signal to generate code word error indications, and
   means for utilizing said code word error indications to initiate resynchronizing of the receiver.

2. A framing circuit for synchornizing a digital receiver to a received time division multiplexed signal, CHARACTERIZED BY,
   means responsive to bits of the received time division signal for generating in accordance with a prescribed criterion a code word having a predetermined number of bits,
   means for comparing said code word bits with bits of the received time division signal to generate code word error indications, and
   means utilizing said error indications for determining whether a framing bit pattern the receiver is synchronized with is a false framing bit pattern.

3. A framing circuit as defined in claim 2 wherein said utilizing means includes means responsive to said error indications for generating a signal to initiate resynchronization of the receiver upon determination that the framing bit pattern synchronized with is a false framing bit pattern.

4. A framing circuit as defined in claim 1 or 3 wherein said code word generating means includes means for generating said code word bits (C1-C6) from a block (for example ESF) having a predetermined number of bits of the time division signal (RTDM) and means for supplying said code words bits (C1-C6) to said means for comparing during a next subsequent received block of bits (ESF) of the time division signal.

5. A framing circuit as defined in claim 4 wherein said utilizing means further includes means for counting a predetermined number of said code word error indications to generate a resynchronization initiation signal.

6. A framing circuit as defined in claim 4 wherein said prescribed criterion includes a predetermined cyclic code generator polynomial.

7. A framing circuit as defined in claim 6 wherein said predetermined number of code word bits is six.

* * * * *